Patented Oct. 23, 1934

1,977,928

UNITED STATES PATENT OFFICE 1,977,928

CREAM PROCESS

Herman D. Wendt, West Chester, Pa., assignor to Milk Processes, Inc., Philadelphia, Pa., a corporation of Pennsylvania No Drawing. Application February 23, 1934, Serial No. 712,653

10 Claims. (Cl. 99—11)

The present invention relates to the art of the treatment and handling of milk products and has has as its primary object the development of a method whereby sour milk products containing butter fat, such as sour milk or sour cream, may be treated to produce sweet milk products of high butter fat content in which the butter fat exists in the dispersed phase; i. e., in which the product is a true cream.

A further object of the invention has been to effect the removal from sour milk products of acids, objectionable curds, and other undesired ingredients, and to produce a cream from which these ingredients have been removed and ultimately convert this cream into a product in which these ingredients have been replaced by other, and desirable ingredients.

In my prior Patent No. 1,791,068 a process has been described involving the production of a plastic cream of high butter fat content by passage of a milk product of normal butter fat content through a centrifugal separator and subsequent cooling of the cream of 65% butter fat content or higher so obtained. In accordance with the present invention, the advantages inherent in the practice of the process of that patent may be attained in connection with sour milk products and these products may be converted by appropriate treatment into equivalent sweet milk products or other products which may be produced from such sweet milk products.

By the practice of the invention sour milk or cream may be converted into sweet milk or cream, sweet butter, ice cream or other creamery product by the removal of undesired acids and curds together with a large proportion of the liquid content of the milk product and replacement thereof by dilution of the concentrated cream product obtained by such removal with desired ingredients of similar general nature but superior quality or of different nature.

Further objects and advantages of the invention will be obvious from a reading of the subjoined specification.

In the preferred form of the invention a sour milk product; e. g., a sour cream of 30% butter fat content is first neutralized and heated. In this connection the preferred practice of the invention involves the addition of a neutralizing agent to convert the cream to a condition of approximately 0.05% acid. The cream may, for example, be neutralized by the addition of a mixture of sodium carbonate and sodium hydroxide and may be forewarmed to a temperature of approximately 110° F. at this stage of the operation. The neutralized and forewarmed cream is next passed to a centrifugal separator in which it is subjected to a centrifugal force of higher degree or longer duration than that ordinarily employed in connection with the production of cream from whole milk. The centrifugal separator is adjusted to deliver a cream effluent containing over 65% butter fat content, as described in my prior patent above referred to. Such centrifugal separation involves the removal from the cream of a large portion of its liquid vehicle and this removal of liquid vehicle serves to extract from the cream a large part of its undesired curd content and of the neutralization products obtained by the reaction of the acid content of the cream with the neutralizer.

In the practice of the invention I prefer to improve the efficiency of this separation of undesired ingredients still further by the dilution of the neutralized sour cream with warm water and the washing of the sour cream with this water. Such dilution and washing may conveniently be accomplished by flowing a stream of warm water into confluence with the flowing stream of neutralized cream passing to the separator and separating the warm water from the butter fat content of the cream together with part of the liquid vehicle within the centrifugal separator. By operating in this manner I am enabled to effectively wash the cream by means of the flowing stream of warm water at the same time that the cream is concentrated to a condition of high butter fat content.

Another feature of the practice of the invention involves the passage of live steam into the neutralized body of cream and this passage may likewise conveniently be attained during the flow of the stream of neutralized cream to the separator. Thus, the flowing stream obtained by mixing hot water with the cream may be subjected to the injection of steam through a jet which projects into the conduit by which these ingredients are fed to the separator. In this connection I prefer to maintain the injection of steam in proportions and under pressure conditions adapted to heat the flowing stream of liquid to a temperature at which flash-pasteurization of such stream occurs. In any case, it is desirable that the steam be injected at a temperature adapted to heat the mixture above 150° F., as it has been found that the heating of the mixture to such elevated temperature has a conditioning effect upon the cream to prevent the separation of any substantial part of the butter fat content thereof in the form of oil under the mechanical influence of the centrifugal separating force applied. When the condition and proportion of the steam are such as to heat the mixture to a temperature above 180° F. the injection of steam not only prevents such undesirable oiling with respect to all types of cream, but attains the object of flash-pasteurization of the cream as suggested above. The injected steam may be vented from the flowing stream of cream and water by passage of the mixture to the feed cup of a conventional centrifugal separator and the venting of the steam from the body of liquid serves to effect removal of volatile impurities therefrom as well as to prevent passage of live steam to the separator and consequent impairment of the efficiency of separation by the turbulent effect of live steam in the centrifugal bowl.

At stated above, the centrifugal separator is adjusted to deliver a liquid cream having a butter fat content in excess of 65%. Such a cream will solidify upon cooling thereof to normal temperatures and in cases in which such cooling is effected without substantial agitation of the cream, such cream will be retained in the liquid phase and can be subsequently reconverted into other creamery products, such as whipping cream, ordinary table cream or whole milk, by dilution. If it is desired to produce sweet cream, for example, from a high butter fat cream of this character, it is only necessary to dilute this cream with a sufficient proportion of skim or whole milk until a liquid product of the desired butter fat content is attained. It will thus be seen that in accordance with one aspect of the practice of the invention sour milk or cream containing curds and acid in such proportions as to render impossible the manufacture of satisfactory sweet creamery products therefrom by ordinary methods can be converted into a sweet cream produce in which these undesired ingredients have been almost completely removed and replaced by other ingredients.

I am aware that the neutralization of sour cream and the centrifugal separation of the neutralization products from the conditioned cream have been heretofore proposed. I wish to point out, however, that the present process constitutes an important improvement over prior processes involving such treatment in that the undesired ingredients of the cream may be almost completely removed from the cream incident to the concentration thereof to a cream of high butter fat content and that the incidental washing and steaming of the neutralized sour milk product also facilitates greatly in the removal of impurities. By the production of a plastic cream in the manner discussed above, I am therefore enabled to produce cream products comparable in quality with those which could be produced from sweet cream or milk by subsequent dilution of this plastic cream and other treatment appropriate to the production of the ultimately desired creamery product.

While the invention has been described above with reference to the treatment of sour cream, it will be evident that it is applicable to the treatment of other sour milk products containing butter fat in dispersed phase; e. g., sour milk.

Modifications will be obvious to those skilled in the art and I do not therefore wish to be limited except by the scope of the subjoined claims. In these claims, I wish it to be understood that the term neutralization is used in its sense as commonly accepted in the buttermaking industry; i. e., as including the reduction or standardizing of acidity by means of alkali, whether or not such alkali is added in sufficient quantity to react with all of the acid present.

I claim:

1. The method of producing a creamery product from sour milk products which comprises neutralizing a sour milk product, thereafter subjecting the neutralized sour milk product to centrifugal force under conditions adapted to remove therefrom a large part of the liquid vehicle, products of neutralization and other undesired ingredients and produce a cream containing over 65% butter fat content and thereafter diluting said high butter fat content cream with a liquid.

2. The method of producing a creamery product from sour milk products which comprises neutralizing a sour milk product, thereafter subjecting the neutralized sour milk product to centrifugal force under conditions adapted to remove therefrom a large part of the liquid vehicle, products of neutralization and other undersired ingredients and produce a cream containing over 65% butter fat content, cooling the cream so produced to a condition of plasticity and diluting said plastic cream with a liquid.

3. The method of producing a creamery product from sour milk products which comprises neutralizing a sour milk product, thereafter subjecting the neutralized sour milk product to centrifugal force under conditions adapted to remove therefrom a large part of the liquid vehicle, products of neutralization and other undesired ingredients and produce a cream containing over 65% butter fat content and thereafter diluting said high butter fat content cream with milk.

4. The method of producing a creamery product from sour milk products which comprises neutralizing a sour milk product, thereafter subjecting the neutralized sour milk product to centrifugal force under conditions adapted to remove therefrom a large part of the liquid vehicle, products of neutralization and other undesired ingredients and produce a cream containing over 65% butter fat content and thereafter diluting said high butter fat content cream with sweet milk.

5. The method of producing a creamery product from sour milk products which comprises neutralizing a sour milk product, thereafter subjecting the neutralized sour milk product to centrifugal force under conditions adapted to remove therefrom a large part of the liquid vehicle, products of neutralization and other undesired ingredients and produce a cream containing over 65% butter fat content, cooling the cream so produced to a condition of plasticity and diluting said plastic cream with milk.

6. The method of producing sweet cream from sour milk products which comprises neutralizing a sour milk product, thereafter subjecting the neutralized sour milk product to centrifugal force under conditions adapted to remove therefrom a large part of the liquid vehicle, products of neutralization and other undesired ingredients and produce a cream containing over 65% butter fat content and thereafter diluting said high butter fat content cream with sweet milk.

7. The method of producing sweet milk from sour milk products which comprises neutralizing a sour milk product, thereafter subjecting the neutralized sour milk product to centrifugal force under conditions adapted to remove therefrom a large part of the liquid vehicle, products of neutralization and other undesired ingredients and produce a cream containing over 65% butter fat content and thereafter diluting said high butter fat content cream with sweet milk.

8. The method of producing a plastic cream from sour milk products which comprises neutralizing a sour milk product, thereafter passing the neutralized sour milk product to a centrifugal separator, passing a stream of hot water into confluence with the stream of neutralized sour milk product passing to the centrifugal separator and subjecting said product to centrifugal force under conditions adapted to remove therefrom a large part of the liquid vehicle, products of neutralization and other undesired ingredients and produce a cream containing over 65% butter fat, and finally cooling the cream so produced to a condition of plasticity.

9. The method of producing a creamery product from sour milk products which comprises neutralizing a sour milk product, thereafter passing steam through the neutralized sour milk product and subjecting said product to centrifugal force under conditions adapted to remove therefrom a large part of the liquid vehicle, products of neutralization and other undesired ingredients and produce a cream containing over 65% butter fat content, and thereafter diluting said high butter fat content cream with a liquid.

10. The method of producing a creamery product from sour milk products which comprises neutralizing a sour milk product, thereafter washing the neutralized sour milk product, passing steam through said product and subjecting said product to centrifugal force under conditions adapted to remove therefrom a large part of the liquid vehicle, products of neutralization and other undesired ingredients and produce a cream containing over 65% butter fat content, and thereafter diluting said high butter fat content cream with a liquid.

HERMAN D. WENDT.